J. PRIOR.

Preserving Apparatus.

No. 99,349.

Patented Feb. 1, 1870.

Witnesses:
Phil F Lamer
Adolph Rock

Inventor:
Jesse Prior
By Geo W Pothwell
atty.

United States Patent Office.

JESSE PRIOR, OF ADRIAN, MICHIGAN.

Letters Patent No. 99,349, dated February 1, 1870.

IMPROVEMENT IN FRUIT-PRESERVING HOUSE.

The Schedule referred to in these Letters Patent and making part of the same.

*To all whom it may concern:*

Be it known that I, JESSE PRIOR, of Adrian, in the county of Lenawee, and State of Michigan, have invented a new and useful Improvement in Fruit-Preserving Houses; and I do hereby declare the following to be a full, clear, and exact description thereof, sufficient to enable others skilled in the art to which my invention appertains, to make and use the same, reference being had to the accompanying drawing, forming part of this specification, in which—

Figure 1:
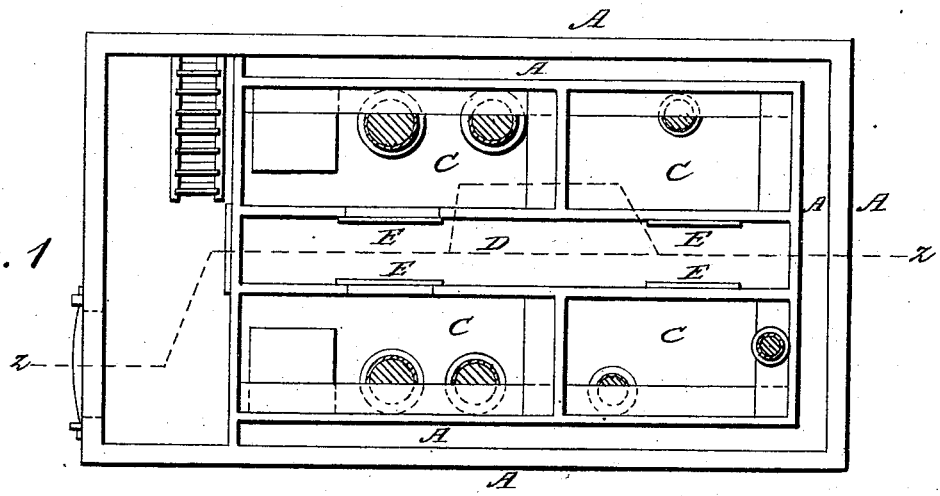
Figure 2:
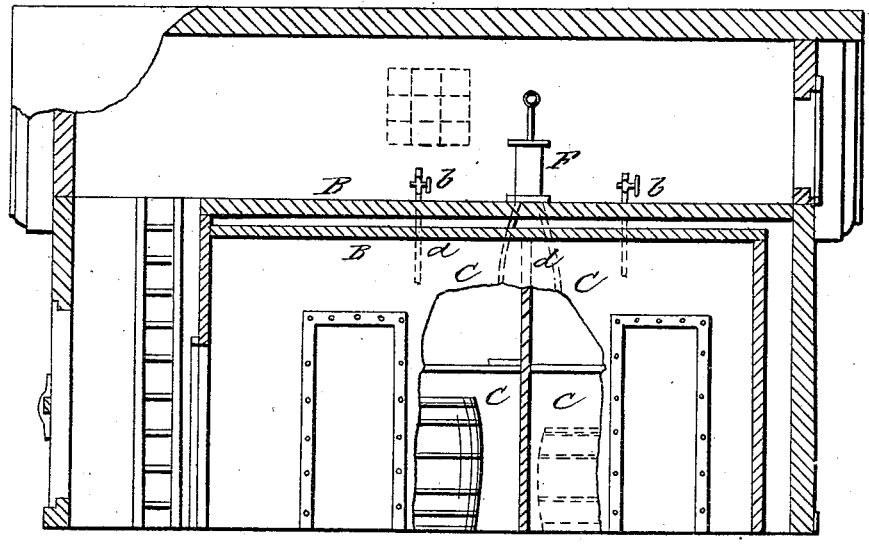

Figure 1 is a plan of a fruit-preserving house, constructed according to my invention, the roof and ceiling being removed to disclose the interior Figure 2 is a vertical section of such a house, the plane of section being indicated by the line $z\ z$, fig. 1.

This invention relates to that class of houses in which fruit is stored for preservation.

Heretofore, in some cases, in order to prevent the decay of the fruit, the storage apartments have been kept at a very low temperature, the external atmosphere being excluded.

In other instances, suitable apparatus has been provided, and the house kept filled with carbonic acid gas.

I have discovered that when fruit is entirely protected from contact with the air, it can be preserved in a perfect state for a long time.

The object of this invention is, therefore, to reduce to a practical form, the theory of preserving fruit by storing it in air-tight apartments, from which all air is exhausted.

The invention consists in so constructing a fruit-preserving house, that an equable temperature is maintained therein, and at the same time the external atmosphere is excluded, the air from the interior being exhausted by means of air-pumps, thus preserving from decay the fruit stored within the several compartments, for an indefinite period of time; the air being admitted by suitable tubes governed by stop-cocks when it is desired that a person should enter any one of the apartments.

My invention will be fully understood from the following detail description of the accompanying drawing, wherein similar letters indicate corresponding parts in the several figures.

I construct my fruit house with double walls A A, as shown in fig. 1, of brick or stone, and a double ceiling, B, as represented in fig. 2, so as to maintain a cool and equable temperature. This house may be mainly below ground, or above, and may be used exclusively for this purpose, or form part of the cellar of a dwelling-house. The walls and roof must be constructed so as to be considerably stronger than the walls and roofs of ordinary buildings, in order to withstand the immense atmospheric pressure which will be exerted on the exterior of the structure, when the air is exhausted from within.

For this reason, it will be probably best to construct the buildings mainly below ground, and this will also have another advantage, as the temperature is not so variable at a depth of several feet, as at the surface. If the building is constructed above the surface, the outer wall must be thicker and stronger, proportionally, than represented in the accompanying drawing.

The interior of the fruit-house is divided by partitions into entirely separate air-tight compartments C, or store-rooms for the fruit, as represented, accessible from passage ways D, through doors E, capable of being hermetically closed.

To prevent the passage of air from one room to another, or from the outside, the walls, partitions, ceilings, and floors are coated with some composition or cement, which, when applied, will form a surface impenetrable by air.

The fruit, carefully gathered, and properly packed in barrels, cans, jars, boxes, baskets, and the like, is stored in the several compartments of the house on the floors or shelves, the kinds needed for early use or sale being suitably assorted and placed together in each room, to avoid opening more than one compartment, until that is emptied of its contents. Some or all of the cans or vessels in which the fruit is placed may be so constructed that the air can be all extracted from them, when deemed necessary.

I design, also, to have a few small compartments for delicate fruits, to be long kept, made accessible from adjoining rooms, when emptied.

The fruit, in the order of its ripening, is packed and stored in the several compartments, and the doors, which are as small as practicable, are closed air-tight by any well known means.

The air is then exhausted from the several apartments, by operating one or more air-pumps F, placed on the floor of the garret or room, if a dwelling, above, as shown in fig. 2.

In some cases, at least, the pumps may be made to communicate, by means of branch-pipes $a\ a$, with two or more compartments, so that air can be exhausted from them simultaneously.

Suitable stop-cocks $b$, which may be either parts of the air-pumps, or separate therefrom, are provided, to admit air to the compartments, when it is desired to enter the same. These stop-cocks are so arranged as to let air into only one compartment at a time, so that when it is desired to remove fruit from the house, air is admitted into the particular compartment which contains the article wanted, thereby restoring the equilibrium of pressure; the door is then opened, and the package removed into the hall, after which the door is replaced, and the air again exhausted by the pumps, as before.

I do not limit myself to any particular form of fruit-storing chamber or house, as these will be constructed in the forms best calculated to withstand atmospheric pressure.

It may be found a very good plan to build the house circular, especially if situated above ground. The compartments themselves, for greater strength, may be built in the form of sections of spheres, or egg-shaped, and flattened on the ground side.

It is believed that the most perishable fruits may be preserved in all their freshness, by storing them in air-tight compartments, from which the air is exhausted, as above described.

I would state, in conclusion, that by means of tubing connecting the air-pump with the cans containing the fruit, the pump above may first exhaust the air from the said cans or packages, and then from the chambers in which they are stored.

I am aware that fruit has heretofore been preserved in fruit-cans, by exhausting the air in said cans by means of an air-pump, as seen in the patent of W. Y. Gill, dated August 14, 1860, whose invention I hereby disclaim, but in Gill's invention, there is no provision made for the introduction of air into his can, and in this respect, my invention differs from his.

Having thus fully described my invention,

What I claim as new, and desire to secure by Letters Patent, is—

The construction of a fruit-preserving house or apartment, with separate air-tight chambers, of sufficient capacity to receive the barrels or other packages of fruit, when provided with means for exhausting and admitting air, all substantially as and for the purpose herein described.

To the above, I have signed my name, this 9th day of August, 1869.

JESSE PRIOR.

Witnesses:
GEORGE JOHNSON,
T. W. HALL.